United States Patent [19]

Boquist et al.

[11] 4,128,776

[45] Dec. 5, 1978

[54] MAGNETOHYDRODYNAMIC ELECTRODE

[75] Inventors: Carl W. Boquist, Chicago; David D. Marchant, Naperville, both of Ill.

[73] Assignee: The United States of America as represented by the United States Department of Energy, Washington, D.C.

[21] Appl. No.: 745,942

[22] Filed: Nov. 29, 1976

[51] Int. Cl.² ............................................. H02N 4/02
[52] U.S. Cl. ..................................................... 310/11
[58] Field of Search .................. 310/11; 252/521, 511, 252/512

[56] References Cited

U.S. PATENT DOCUMENTS

| | | | |
|---|---|---|---|
| 3,149,253 | 9/1964 | Luebke ................................... | 310/11 |
| 3,280,349 | 10/1966 | Brenner et al. ......................... | 310/11 |
| 3,574,144 | 4/1971 | Yerouchalini et al. ............... | 252/521 |
| 3,660,701 | 5/1972 | Blattmann et al. .................... | 310/11 |

*Primary Examiner*—Donovan F. Duggan
*Attorney, Agent, or Firm*—Dean E. Carlson; Frank H. Jackson; James W. Weinberger

[57] ABSTRACT

A ceramic-metal composite suitable for use in a high-temperature environment consists of a refractory ceramic matrix containing 10 to 50 volume percent of a continuous high-temperature metal reinforcement. In a specific application of the composite, as an electrode in a magnetohydrodynamic generator, the one surface of the electrode which contacts the MHD fluid may have a layer of varying thickness of nonreinforced refractory ceramic for electrode temperature control. The side walls of the electrode may be coated with a refractory ceramic insulator. Also described is an electrode-insulator system for a MHD channel.

9 Claims, 4 Drawing Figures

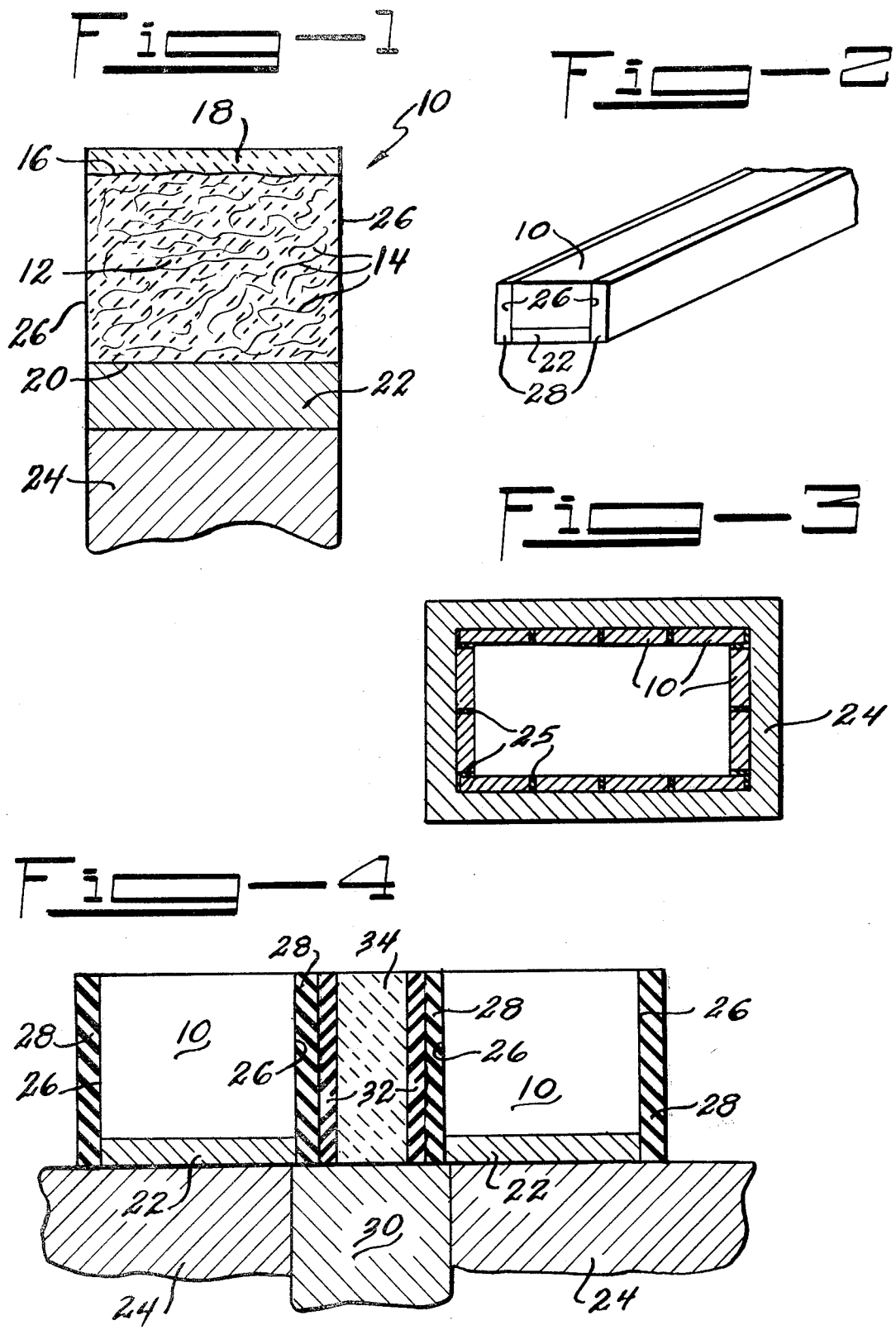

4,128,776

MAGNETOHYDRODYNAMIC ELECTRODE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a ceramic-metal composite suitable for use in a high-temperature environment. More specifically, this invention relates to a ceramic-metal composite electrode for use as a current collector in the channel of a magnetohydrodynamic generator.

The principle of magnetohydrodynamic power generation utilizes heat to produce a high-velocity stream of electrically conducting fluid, which is then passed through a magnetic field to convert the kinetic energy of the stream into electrical energy. A typical diagonal window frame MHD power generator is an elongated duct or channel constructed of a large number of open rectangular forms or "window frames" fastened together side-by-side and insulated from each other. Around the inner perimeter of each frame are located a number of individual, generally rectangular, electrodes for collecting the electrical energy generated in each frame by the passage of the high-temperature conductive fluid. Other generator geometries can also be used but in each case a number of electrodes are present and separated from each other by an electrical insulator since some will act as anodes and some as cathodes as the plasma passes through the channel.

The plasma within the channel may reach temperatures up to 2800° C., resulting in electrode-plasma temperatures up to 2100° C. The plasma may be an ionized gas or an inert gas seeded with a conductor such as potassium. The plasma passes through the duct at a rate of speed which may approach and even exceed the sonic velocity. The plasma environment may be slightly oxidizing, depending upon the particular fluid being used and its source. Thus, it is a problem to find a material from which electrodes can be made which can withstand the rigors of such an environment. Ideally, such an electrode material would be a highly refractory ceramic that is highly corrosion-erosion-resistant, dense, strong, thermal-shock-resistant, chemically inert and a good electrical conductor.

Electrodes have been fabricated from a variety of materials like zirconia, either alone or combined with a metal alloy such as Inconel. They have been tried in MHD generators but do not possess all of the desirable characteristics required of a good high-temperature electrode.

SUMMARY OF THE INVENTION

We have developed a ceramic-metal composite from which suitable electrodes can be prepared and also an electrode-insulator system which meets many of the requirements for use in a MHD generator channel. The composite of our invention consists of a refractory ceramic matrix containing 10 to 50 volume percent of a continuous metal reinforcement which is an electrically conductive, nonferromagnetic, oxidation-resistant metal or alloy melting above 1000° C. The upper surface of an electrode constructed of this composite may contain a layer of varying thickness of the refractory ceramic to provide additional oxidation resistance and electrode temperature control. The two sides of the electrode are coated with a refractory ceramic insulator. The electrode-insulator system of the invention consists of the electrode including the insulated side walls, a pliable high-temperature-resistant separator and a refractory ceramic insulator.

It is therefore one object of the invention to provide a material capable of withstanding a high-temperature, corrosive and erosive environment.

It is another object of the invention to provide an electrode suitable for use in the high-temperature environment of a magnetohydrodynamic generator.

It is still another object of the invention to provide a ceramic-metal composite suitable for use as an electrode in a magnetohydrodynamic generator.

Finally, it is the object of the invention to provide an electrode-insulator system suitable for use in a magnetohydrodynamic generator.

BRIEF DESCRIPTION OF THE DRAWINGS

FIG. 1 is a cross-sectional view of the electrode of the invention.

FIG. 2 is a perspective view of a complete electrode assembly.

FIG. 3 is a cross-sectional view of a MHD channel showing the electrodes in place on a single frame.

FIG. 4 is a cross-sectional view of a portion of two MHD generator frames showing the electrode-insulator system.

BRIEF DESCRIPTION OF THE PREFERRED EMBODIMENT

Referring to FIGS. 1 and 2, the electrode 10 consists of a refractory ceramic matrix 12 containing 10 to 50 volume percent of a continuous metallic reinforcement 14. Top surface 16 which is in contact with the MHD plasma may contain a layer of varying thickness which is unreinforced refractory ceramic material 18. Bottom surface 20 is fastened to an intermediate attachment plate 22 which is in turn fastened to frame 24, while side walls 26 of the electrode 10 are coated with a layer of a refractory ceramic insulation 28 which may extend down over the edges of plate 22 to complete the electrode assembly.

The continuous metal reinforcement may vary from 10 to 50 volume percent of the electrode and may consist of a large number of short individual metal fibers which have been joined together to form a continuous mat. Other reinforcements may be a monolithic low-density open-pore metal foam or a three-dimensional woven wire fabric. It is necessary that the metallic reinforcement be continuous and that at least a portion of the reinforcement contact the intermediate attachment plate so that there is continuity of electrical conductivity throughout the electrode to the frame, since one purpose of the reinforcement is as a current carrier at low temperatures during start-up of the generator before the refractory material reaches a temperature at which it becomes electrically conductive. The reinforcement also acts to improve the thermal shock resistance of the refractory ceramic which is a problem typically encountered in MHD channels, particularly in an emergency shutdown.

In addition to being electrically conductive, the metallic phase, which may be a metal or an alloy, must have a melting point above about 1000° C., be nonferromagnetic and, because of the oxidation potential of the environment, have at least some degree of oxidation resistance. Metals and alloys which will satisfy most of the above requirements for reinforcement include the refractory metals and alloys of the refractory metals, such as tungsten, molybdenum, niobium, tantalum, the nickel-based alloys of chromium and molybdenum, such as Hastelloy B ® and X and Inconel 600 ®, the cobalt-based alloys, and the noble metals. The preferred metals are pure niobium, hafnium, tantalum and molybdenum and alloys of niobium — 1–10% zirconium, hafnium, 20 to 30 weight percent tantalum, nickel-chromium alloys and the nickel-molybdenum alloys. It may be necessary to provide some of the less oxidation-resistant metals such as niobium, tantalum or molybdenum with an oxidation-resistant coating such as platinum.

While it is preferred that the metallic reinforcement occupy from 10 to 50 v/o of the electrode, the electrode may also be prepared so that the reinforcement varies gradually from 100% metal at the bottom or base of the electrode to 100% refractory ceramic at the top portion of the electrode.

The refractory ceramic may be any material that is capable of withstanding a temperature of up to about 2200° K. under a partial pressure of oxygen which may be up to $10^{-3}$ atmospheres, is corrosion and erosion-resistant and is electrically conductive at a temperature above about 1200° C. The preferred ceramics include stabilized zirconia and hafnia and spinel doped with 10 to 50 mole percent iron or chromium to improve conductivity. Less important but also useful are yttria and lanthanum-chromite doped with 2 to 10 mole percent strontium. It is important that the zirconia and hafnia be at least partially stabilized by the addition of from 1 to 60 mole percent (m/o), generally 5 to 10 m/o, yttria, ceria, neodymia, praseodymia, calcium oxide or magnesium oxide to prevent potentially destructive volume changes which accompany crystalline transformation during heating and to improve electrical conductivity. For example, hafnia might contain about 1 to 10 m/o, preferably 8 to 10 m/o, yttria to prevent phase changes, and 2 to 12 m/o, preferably 6 to 10 m/o, ceria to enhance electrical conductivity.

The intermediate attachment plate may be of any metal which is electrically and thermally conductive and has a coefficient of thermal expansion which is intermediate between that of the copper channel frame and the ceramic electrode, such as stainless steel. The plate may be flat as shown or it may be any shape, for example corrugated, which will provide the necessary conductivity and yet be slightly flexible.

The refractory insulative material applied to the sides of the electrode must be a material which is electrically nonconductive at MHD channel operating temperatures, such as magnesia, alumina or magnesia-alumina spinel. Preferably the insulation is a 5 to 10 mil thick layer of spinel which can be applied to both sides of the electrode by flame spraying.

The electrodes may be prepared by any convenient method, for example by placing the continuous metal reinforcement of proper density, cut to size, into a mold of the proper size and shape, infiltrating the metal with powdered refractory ceramic material and then filling the mold with the powdered ceramic. The material is then hot-pressed at a temperature of from about 1250° C. to 1800° C. and a pressure of about 2000 to 5000 psi to form an electrode having a density of from about 90 to 95% of theoretical and containing about 10 to 50 v/o metal.

The upper portion of the electrode containing the pure refractory oxide may vary in thickness from about ½ to about 2 mm depending upon the temperature of the position of the electrode within the MHD channel in order to maintain the electrode at a conductive temperature and to protect the metal reinforcement from the oxidizing atmosphere. Thus at the entrance end of the channel where the temperature is the highest, it may be advantageous for the pure layer to be thinner to improve thermal conductivity, while at the exit or cooler end of the channel a thicker layer of pure refractory ceramic may be more desirable.

The electrodes may be fabricated in a variety of shapes and cross sections as required by the MHD channel geometry, but generally will be square or rectangular in cross section with a generally rectangular or parallelepiped shape.

In FIG. 3, there is shown a cross section of a MHD channel section consisting of an open rectangular "window frame" 24, generally of copper, showing a number of electrodes 10 fixedly attached and spaced about the inner perimeter of the frame, separated from each other by insulator 25.

In a diagonal window frame channel where the frames are placed side by side, it is necessary that adjacent frames and electrodes be electrically insulated from each other, while at the same time the space between the frames and electrodes is sealed to prevent the deposit and build-up of seed or other condensibles from the plasma which might short out the electrodes.

FIG. 4 is a cross-sectional view of a portion of two frames of an MHD channel showing the electrode-insulator system of the invention. As shown, the electrodes 10 having both side walls coated with insulation 28 are mounted on intermediate plate 22 which may be stainless steel which in turn are mounted on the inner perimeter of copper frames 24 of the MHD channel. The frames are separated by castable filler 30 which may be magnesium oxide or polyimide. Between the two electrodes 10 is a refractory ceramic separator 32, which is an electrical insulator at high temperatures such as a dense spinel or magnesium oxide. Separator 32 is in turn separated on either side from the electrode 10 by pliable high-temperature-resistant pad 34, which may be, for example, a zirconia felt 5 to 10 mils thick. Pliable pad 34 provides a seal between the ceramic separator 32 and insulative surface 28 on electrode 10 which generally have a rough surface and which could not otherwise be sealed with a non-pliable material without machining the surfaces.

The electrodes may be attached to the intermediate attachment plate and the plate attached to the copper frame by any convenient method such as, for example, brazing.

Electrodes as hereinbefore described have been prepared by chopping 10 to 20 mil niobium wire into lengths of about 1 cm. The chopped wire was placed in random fashion in a mold and diffusion bonded into a mat or felt form by heating to about 2200° C. for 6 hours under a vacuum. The semi-rigid mat was plated with approximately 0.2 mil platinum. The plated mat was cut into an electrode-size mat 5/16 × ½ × 3 inches, placed into the bottom of a mold ⅜ inch square by 3 inches long and infiltrated with refractory ceramic powder of hafnia-8 w/o yttria, 10 w/o ceria. Additional powder was placed in the mold above the mat to form a layer of pure ceramic about 1 mm thick. The green electrode was then hot-pressed at 3000 psi pressure and 1500° C.

to form the electrode of the invention. Preliminary laboratory tests of the electrode have shown it to be resistant to pitting, have good structural strength and the required electrical conductivity properties. The stabilized hafnia has adequate electrical conductivity above 1200° C. The ceramic metal matrix has adequate electrical conductivity to room temperature. In compatibility tests at different temperatures, the hafnium oxide is resistant to potassium seed attack. The electrode has maintained integrity when tested for thermal shock stability by air quenching from 1000° C.

The embodiments of the invention in which an exclusive property or privilege is claimed are defined as follows:

1. A composite electrode for use in a magnetohydrodynamic generator comprising:
    a refractory ceramic matrix containing 10 to 50 volume percent of a continuous metal reinforcement which is an electrically conductive nonferromagnetic, oxidation-resistant metal or alloy melting above 1000° C., the metal being selected from the group consisting of niobium, hafnium, tantalum, molybdenum, and alloys of niobium-zirconium, hafnium-tantalum, nickel-chromium and nickel-molybdenum, the form of the reinforcement being selected from the group consisting of a sintered fiber mat, an open-pore foamed metal and a three-dimensional woven wire fabric, and the refractory ceramic matrix being selected from the group consisting of stabilized zirconium oxide, stabilized hafnium oxide, iron-doped spinel, chromium-doped spinel, yttrium oxide and strontium-doped lanthanum chromite; the electrode having a top surface, a bottom surface and parallel side walls; an electrically and thermally conductive intermediate attachment plate fastened to the bottom surface of the electrode in electrical contact with the metal reinforcement, the plate having edges in line with the side walls; the side walls of the electrode and edges of the atachment plate being coated with a layer of refractory ceramic electrical insulating material; and a layer of unreinforced refractory ceramic on the top surface of the electrode.

2. The electrode of claim 1 wherein the insulating material is spinel.

3. The electrode of claim 2 wherein the intermediate attachment plate is stainless steel.

4. An electrode-insulator system for use in an MHD generator comprising:
    an electrode having an upper surface, a bottom surface and two opposite side walls, the electrode being constructed of a refractory ceramic matrix containing 10 to 50 volume percent of a continuous metal reinforcement which is an electrically conductive, nonferromagnetic, oxdiation-resistant metal or alloy melting above 1000° C., the bottom surface being attached to an electrically and thermally conductive intermediate attachment plate having edges in line with the side walls, and the side walls and plate edges are coated with a layer of refractory ceramic electrical insulating material;
    a pliable high-temperature-resistant pad next to the insulating material coated side wall; and
    a refractory ceramic separator of high-temperature electrically insulating material next to the pad.

5. The electrode insulator system of claim 4 wherein the upper surface of the electrode contains a layer of unreinforced refractory ceramic.

6. The electrode-insulator system of claim 5 wherein the metal reinforcement is selected from the group consisting of niobium, hafnium, tantalum, molybdenum, and alloys of niobium-zirconium, hafnium-tantalum, nickel-chromium and nickel-molybdenum.

7. The electrode-insulator system of claim 6 wherein the refractory ceramic matrix is selected from the group consisting of stabilized zirconium oxide, stabilized hafnium oxide, iron-doped spinel, chromium-doped spinel, yttrium oxide and strontium-doped lanthanum chromite.

8. The electrode-insulator system of claim 7 wherein the physical form of the continuous metallic reinforcement is selected from the group consisting of a sintered fiber mat, an open-pore foamed metal and a three-dimensional woven wire fabric.

9. The system of claim 8 wherein the pliable high-temperature-resistant pad is zirconia felt, and the refractory ceramic separator is constructed of material selected from the group consisting of dense spinel and magnesium oxide.

* * * * *